Patented Oct. 27, 1925.

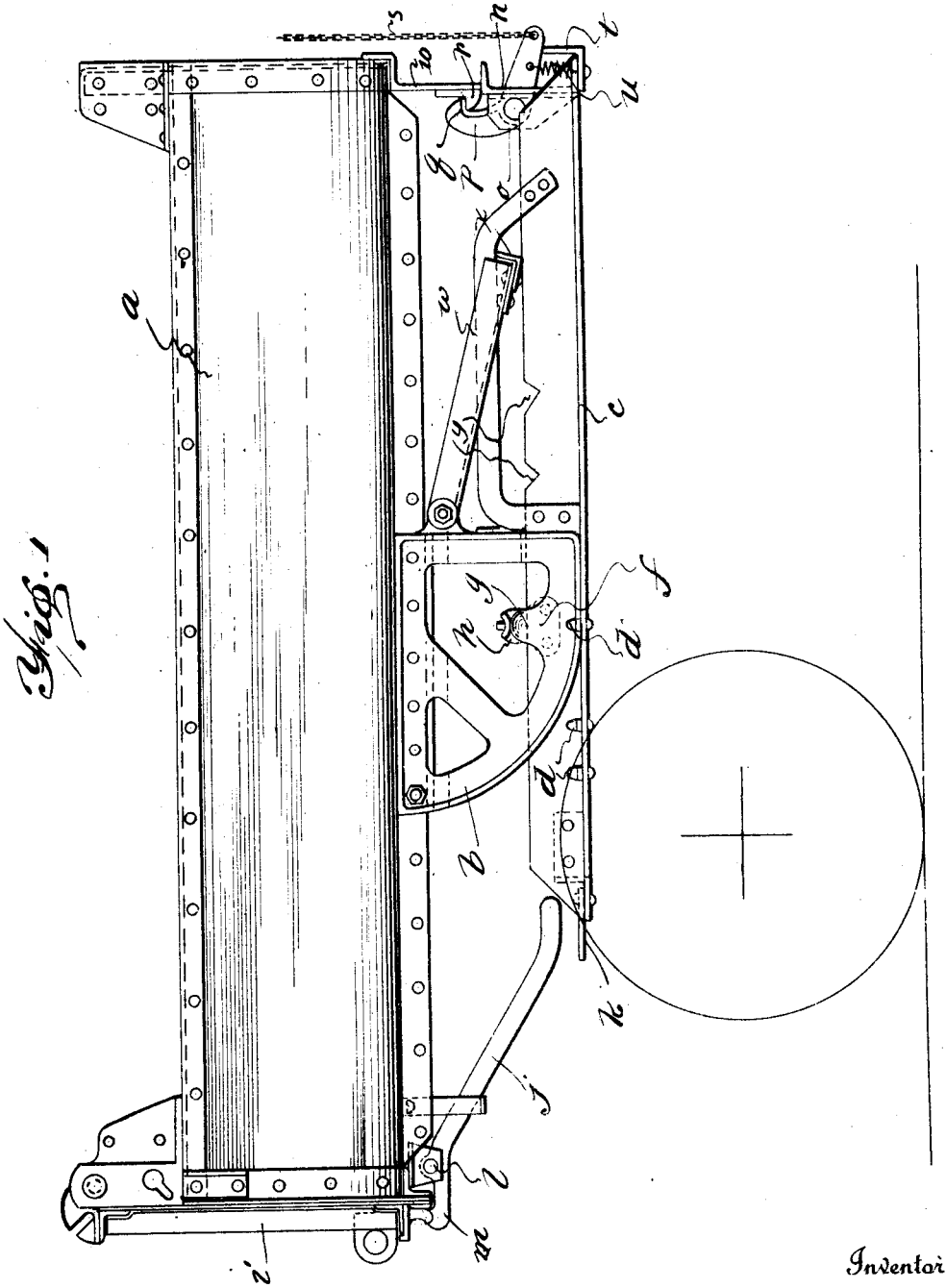

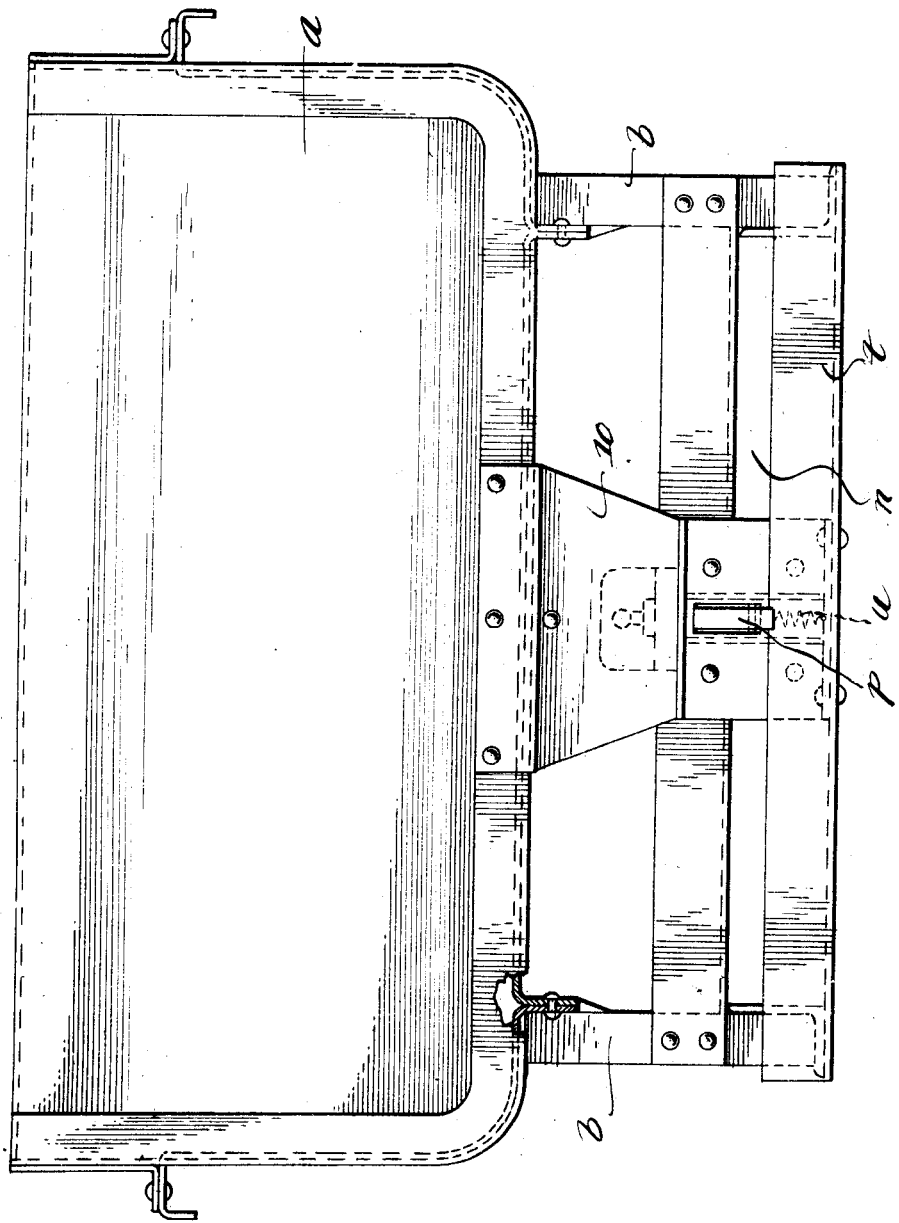

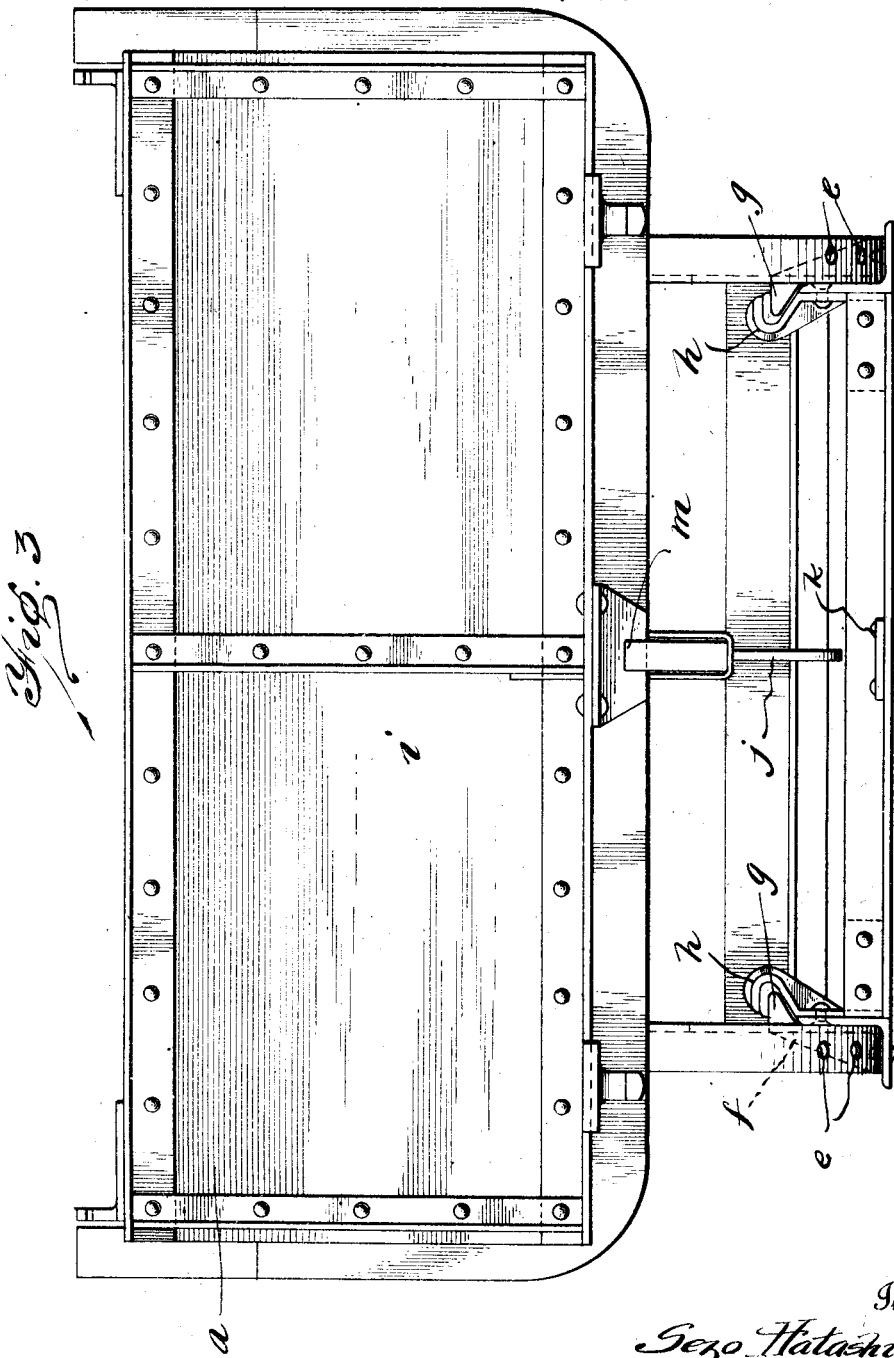

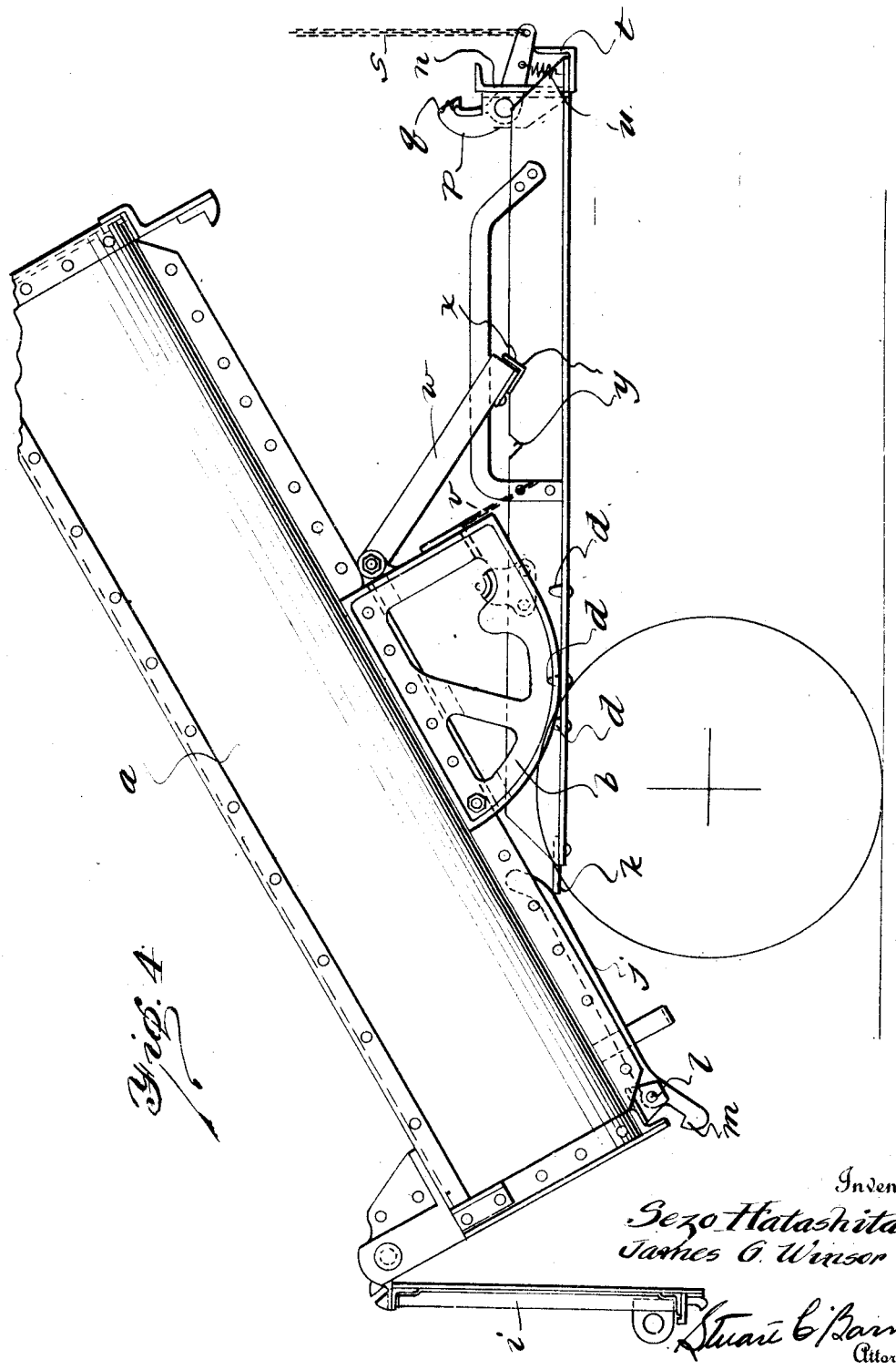

1,559,490

UNITED STATES PATENT OFFICE.

JAMES G. WINSOR AND SEZO HATASHITA, OF DETROIT, MICHIGAN.

DUMP BODY.

Application filed June 30, 1923. Serial No. 648,646.

*To all whom it may concern:*

Be it known that JAMES G. WINSOR and SEZO HATASHITA, citizens of the United States, residing at Detroit, in the county of Wayne and State of Michigan, have invented certain new and useful Improvements in Dump Bodies, of which the following is a specification.

This invention relates to dump bodies and has in view particularly a dump body which when released will automatically rock to dumping position in the rear of the vehicle and unlock the tail gate to discharge the contents.

Another object is to provide means for positively holding the hopper, when it is returned to the horizontal position.

In the drawings:

Fig. 1 is a side elevation of the dump body.

Fig. 2 is a front elevation of the dump body.

Fig. 3 is a rear elevation of the dump body.

Fig. 4 is a side elevation of the dump body in dumping position.

The dump body consists of a box type of hopper $a$ which is supported on rockers $b$ engaging with the rails $c$ of the sub-frame carried by the chassis frame. The rails are provided with the teeth $d$ that engage in openings $e$ in the rocker to properly measure the travel of the rockers on the rails and prevent their slipping on said rails.

The dump body is provided with a jump lock consisting of an inwardly extending boss or lug $f$ having a rounded upper surface $g$ formed integral with the rocker which is secured to the hopper. The keeper part of said jump lock consists of a retaining bracket $h$ secured to the rail $c$ provided with a recessed portion, into which the lug $f$ is adapted to engage. Upon releasing the hopper the body when loaded, will automatically start to tip and roll upon the rockers $b$ causing the lug $f$ to move out from the recess in said retaining bracket. As this lug will move upwardly as well as longitudinally upon the tipping of the hopper, the retaining wall of the recess is curved in the form of an inverted crown in order to provide sufficient clearance for the free passage of the lug $f$ out from said recess. When the hopper is empty it will automatically rock back to its initial horizontal position, the automatic latch at the forward end of the dump body cooperating with the jump lock to positively lock the hopper in place and prevent any sideways or vertical movement of said hopper.

A tail gate $i$ is hinged at the top of the rear of the hopper and when the hopper is tipped the lever $j$ will strike the sub-frame $k$ of the vehicle. The lever $j$ is pivoted at $l$ and the end $m$ is formed into a latch which engages the lower edge of the tail gate. As the hopper continues to tip the latch will release the tail gate and allow the contents of the hopper to be dumped.

The forward end of the vehicle is provided with channel member $n$ which has a bracket $o$ secured thereto. A latch member $p$ is pivoted to the bracket which has a lip portion $q$ adapted to engage with the keeper $r$ carried by a transverse supporting girder 10 secured to the hopper. A chain $s$ is secured to the other end of the latch member $p$ for the purpose of manually operating the latch to release the hopper for dumping. A transverse angle member $t$ secured to the sub-frame serves as a stop for limiting the movement of said latch member. A spring $u$ tends to hold the latch against the stop and keep the latch in a position so that the keeper $r$ will engage with the lip $q$ when the empty hopper rolls back to its initial position and hold the hopper in a fixed horizontal position.

A usual check chain $v$ is provided to prevent the hopper from tipping clear over when the latch is released for dumping the load. A brace member $w$ is pivoted to the hopper and is provided with a cross angle member $x$ adapted to engage in notches $y$ in the rail member to hold the hopper in a tilted position.

What we claim is:

1. In a vehicle as specified, the combination of a subframe provided with a rail, a hopper supported thereon, a rocker secured to the hopper arranged to roll on the rail, a jump lock comprising a bracket secured to the rail provided with an overhanging retaining portion and a lug carried by the rocker arranged to roll under the retaining portion and wedge therein to lock the hopper to the subframe, and means for locking the hopper and subframe together at the forward end.

2. In a vehicle as specified, the combination of a subframe provided with a rail formed of an angle section, a hopper supported thereon provided with a rocker adapted to roll on the horizontal flange of said angle section, a jump lock comprising a keeper member secured to the vertical flange of the angle section and a striker member carried by the rocker, said striker and keeper members arranged to wedge together to lock the hopper to the subframe, and means for locking the hopper and subframe together at the forward end.

3. In a vehicle as specified, the combination of a subframe provided with a rail, a hopper supported thereon, a rocker secured to the hopper and adapted to roll on the rail carried by said subframe, and a jump lock comprising a keeper member secured to the rail provided with a retaining portion having its lower engaging face curved in the form of an inverted crown and a lug carried by the rocker arranged to roll under the said retaining portion of the keeper member and wedge against the lowermost point of the inverted crown to lock the hopper to the subframe, said lower engaging face of the retaining portion curved to provide clearance for the lug to enter thereunder.

In testimony whereof we affix our signatures.

JAMES G. WINSOR.
SEZO HATASHITA.